(12) United States Patent
Bharwani

(10) Patent No.: US 12,228,420 B2
(45) Date of Patent: Feb. 18, 2025

(54) CREATING OFFROAD MAPS WITH VEHICLE DATA

(71) Applicant: Rivian IP Holdings, LLC, Plymouth, MI (US)

(72) Inventor: Kiran Kumar Ram Bharwani, San Ramon, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 10 days.

(21) Appl. No.: 17/517,918

(22) Filed: Nov. 3, 2021

(65) Prior Publication Data
US 2023/0138909 A1    May 4, 2023

(51) Int. Cl.
*G01C 21/00*    (2006.01)

(52) U.S. Cl.
CPC ..... *G01C 21/3815* (2020.08); *G01C 21/3826* (2020.08); *G01C 21/3848* (2020.08); *G01C 21/387* (2020.08)

(58) Field of Classification Search
CPC ............ G01C 21/3815; G01C 21/3826; G01C 21/3848; G01C 21/387
See application file for complete search history.

(56) References Cited

U.S. PATENT DOCUMENTS

| | | | |
|---|---|---|---|
| 10,810,504 B1 * | 10/2020 | Fields .................. | B60W 40/09 |
| 2009/0312942 A1 * | 12/2009 | Froeberg ............ | G01C 21/3461 |
| | | | 701/532 |
| 2013/0096752 A1 * | 4/2013 | Severinsky ............. | B60L 50/16 |
| | | | 703/2 |
| 2016/0293005 A1 * | 10/2016 | Nomoto ........... | G08G 1/096716 |
| 2017/0132918 A1 * | 5/2017 | Uno .................. | G08G 1/096741 |
| 2018/0129276 A1 * | 5/2018 | Nguyen ................ | G06F 3/0304 |

(Continued)

FOREIGN PATENT DOCUMENTS

| | | | | |
|---|---|---|---|---|
| JP | 2010014665 A | * | 1/2010 | |
| WO | WO-2020207755 A1 | * | 10/2020 | ......... H04L 63/0421 |
| WO | WO-2021079494 A1 | * | 4/2021 | |

OTHER PUBLICATIONS

Dec. 23, 2022 Combined Search and Examination Report issued in corresponding GB application No. 2209163.1.

*Primary Examiner* — Aryan E Weisenfeld
*Assistant Examiner* — Farhad Dawodi
(74) *Attorney, Agent, or Firm* — BAKERHOSTETLER

(57) ABSTRACT

Disclosed embodiments include systems, vehicles, and computer-implemented methods for logging positional coordinates and additional data for an unmapped route. In an illustrative embodiment, a system includes a computing device including: a positioning system configured to determine positional coordinates of the positioning system; a processor; and computer-readable media configured to store computer-executable instructions configured to cause the processor to: responsive to determining that the positional coordinates indicate that the positioning system is operating on an unmapped route that is not included in existing map data accessible by the processor, log the positional coordinates for each of a plurality of points along the unmapped route in a new map data set; log additional data for at least a portion of the unmapped route in the new map data set; and communicate the new map data set to a remote data store from which another user can access the new map data.

21 Claims, 14 Drawing Sheets

(56) References Cited

U.S. PATENT DOCUMENTS

| | | | |
|---|---|---|---|
| 2019/0285428 A1* | 9/2019 | Ziezold | G06T 3/40 |
| 2019/0301873 A1* | 10/2019 | Prasser | G01C 21/3848 |
| 2020/0310450 A1* | 10/2020 | Reschka | G01C 21/3815 |
| 2020/0413458 A1* | 12/2020 | Kennedy | H04W 4/024 |
| 2021/0108924 A1* | 4/2021 | Vedaste | G01C 21/3848 |
| 2021/0278210 A1* | 9/2021 | Schleicher | B60W 40/112 |
| 2021/0370958 A1* | 12/2021 | Moshchuk | B60W 40/105 |

* cited by examiner

FIG. 3
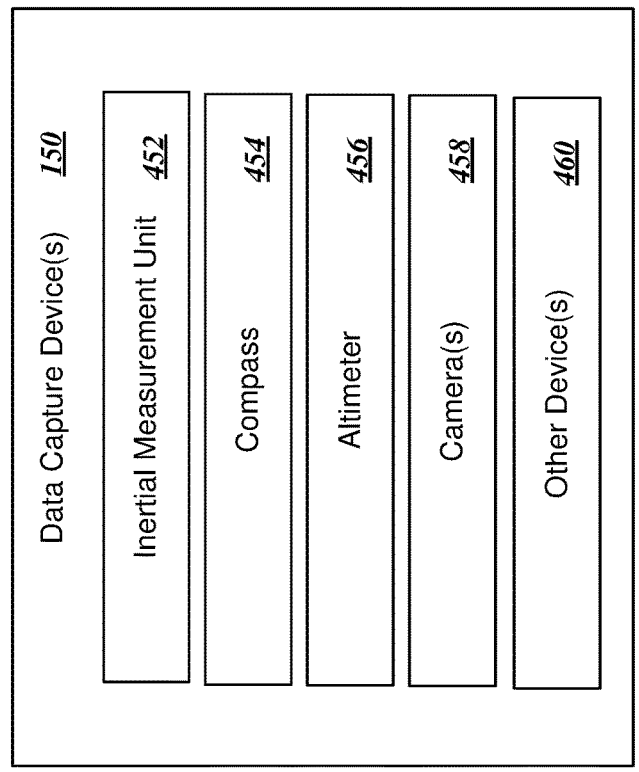
FIG. 4
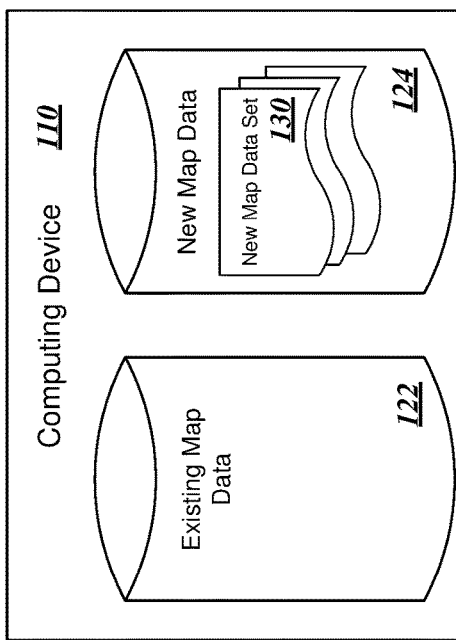
FIG. 2
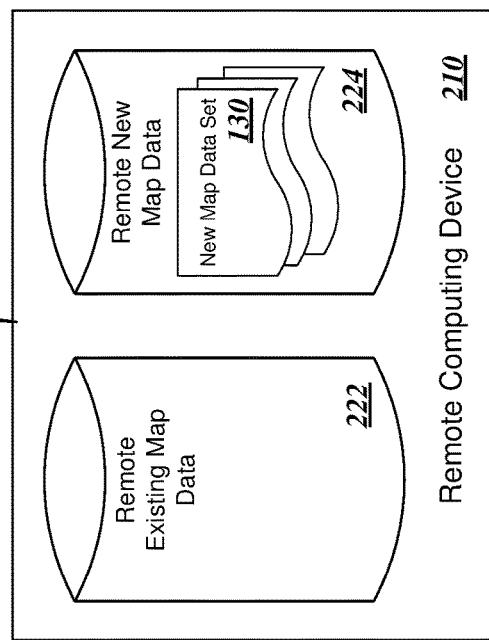

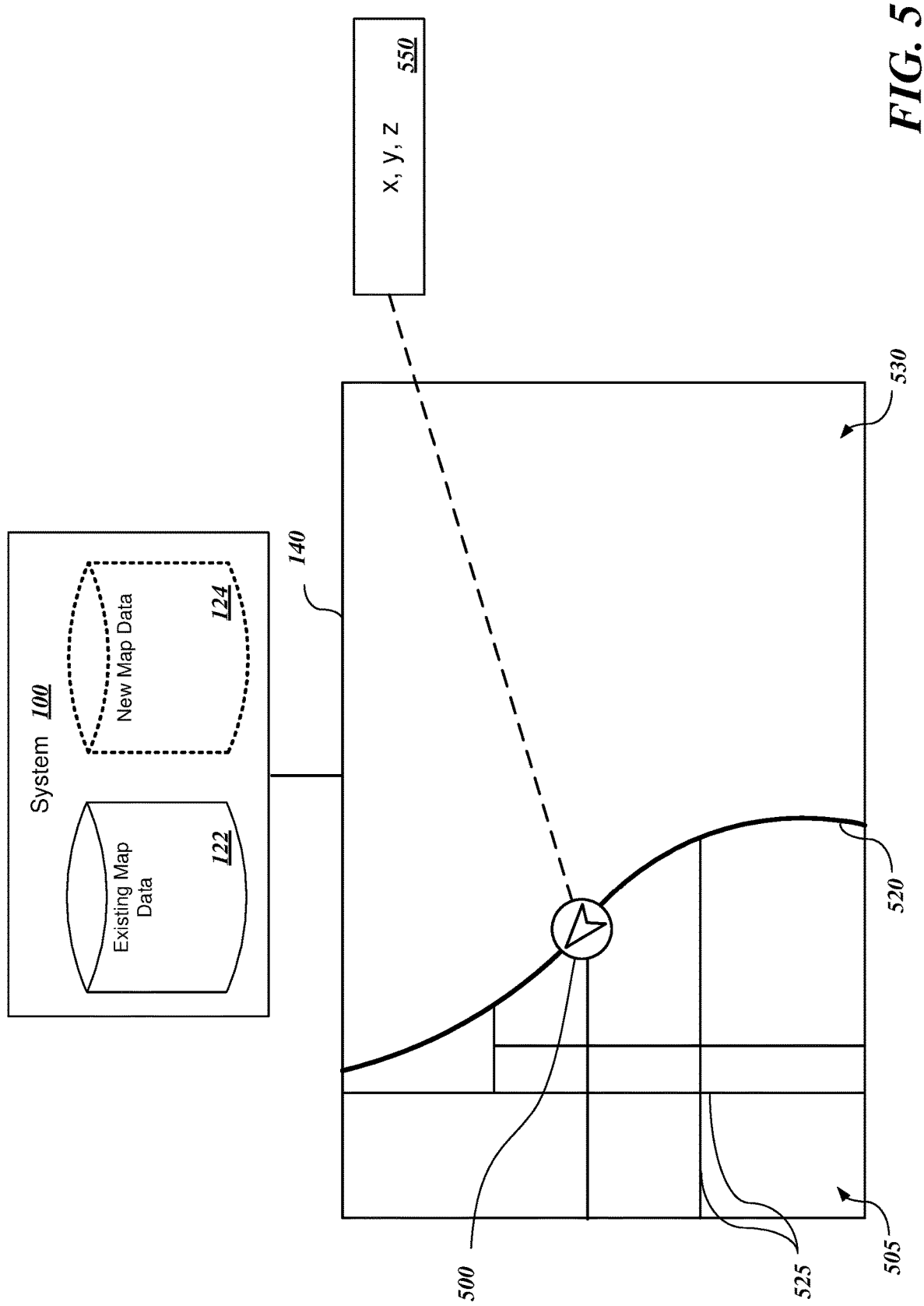

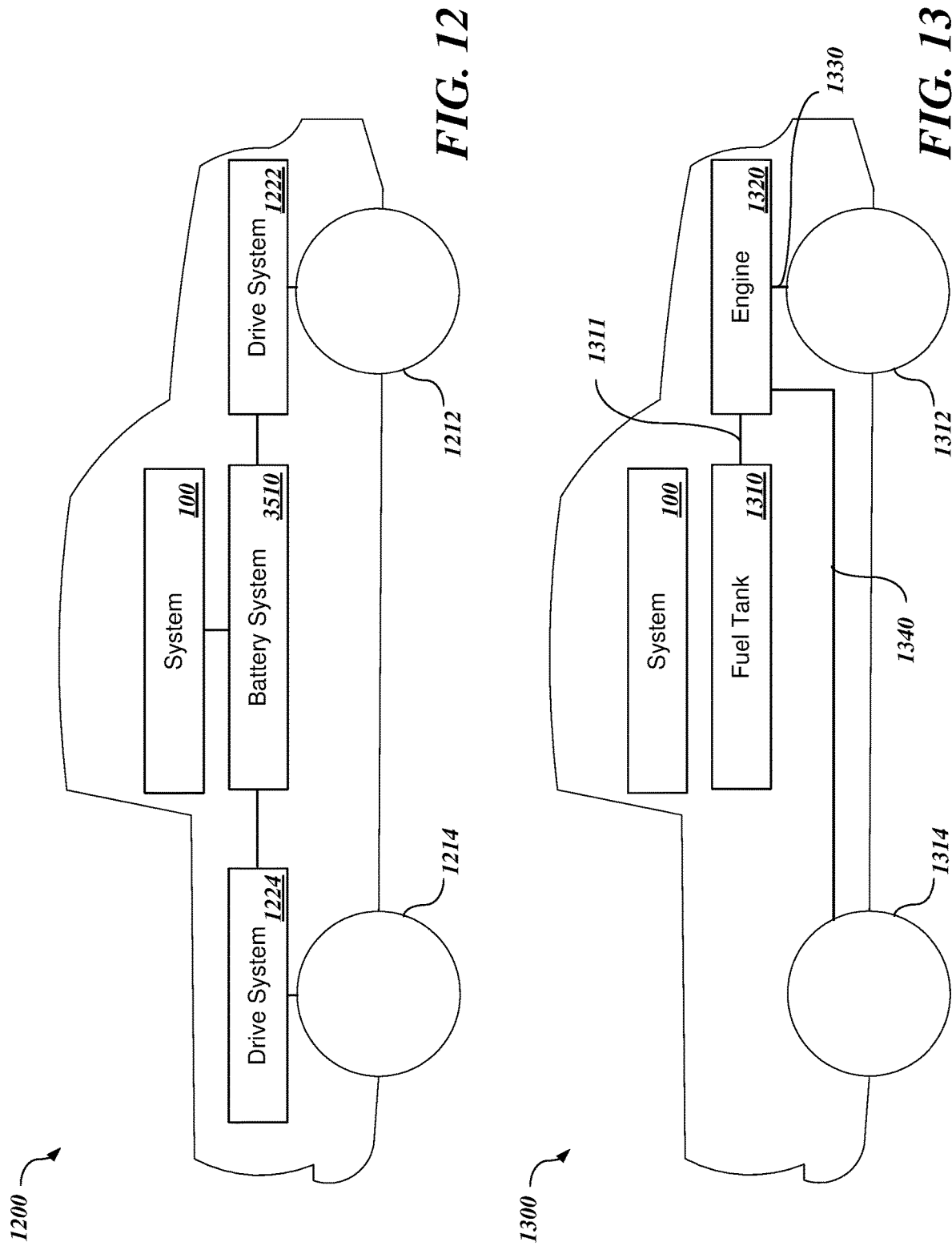

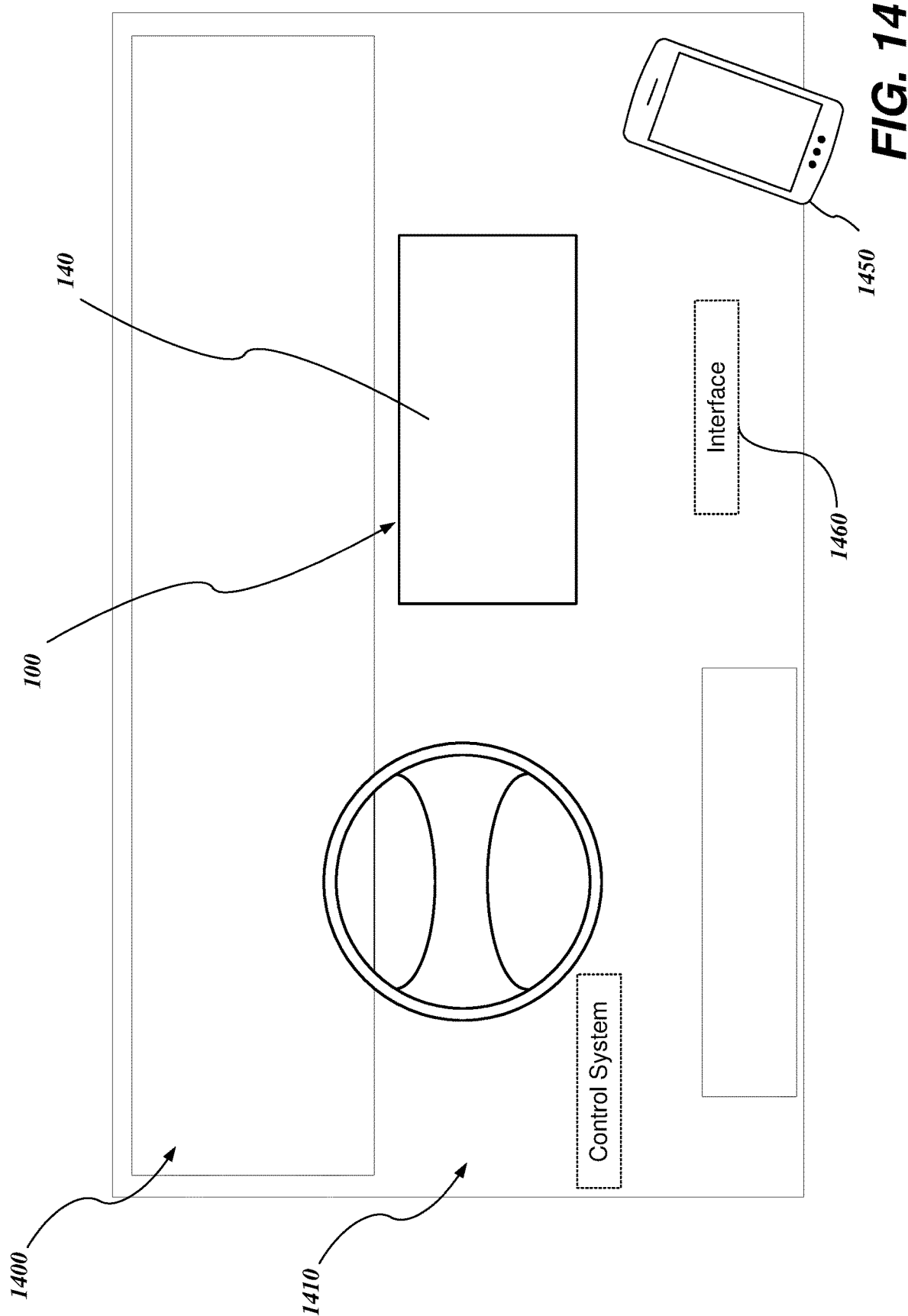

CREATING OFFROAD MAPS WITH VEHICLE DATA

INTRODUCTION

Detailed databases exist that plot the details of most roadways. Thus, when vehicles are operated on roads, navigation systems may be use the databases to accurately identify a position of the vehicle relative to the current route, other roads, and other landmarks or points of potential interest. By contrast, when a vehicle travels an unmapped route, such as when the vehicle engages in offroad travel, the databases of existing roadways may provide little or no information about the terrain being traveled. Thus, an operator of a vehicle may have little or no information about offroad terrain before embarking on the offroad terrain or while the vehicle is travelling that terrain.

The statements in this section merely provide background information related to the present disclosure and may not constitute prior art.

SUMMARY

Disclosed embodiments include systems, vehicles, and computer-implemented methods for logging positional coordinates and other data for an unmapped route.

In an illustrative embodiment, a system includes a computing device including: a positioning system configured to determine positional coordinates of the positioning system; a processor; and computer-readable media configured to store computer-executable instructions configured to cause the processor to: responsive to determining that the positional coordinates indicate that the positioning system is operating on an unmapped route that is not included in existing map data accessible by the processor, log the positional coordinates for each of a plurality of points along the unmapped route in a new map data set; log additional data for at least a portion of the unmapped route in the new map data set; and communicate the new map data set to a remote data store from which another user can access the new map data.

In another illustrative embodiment, a vehicle includes a vehicle body; a drive system; and a computing device including: a positioning system configured to determine positional coordinates of the positioning system; a processor; and computer-readable media configured to store computer-executable instructions configured to cause the processor to: responsive to determining that the positional coordinates indicate that the positioning system is operating on an unmapped route that is not included in existing map data accessible by the processor, log the positional coordinates for each of a plurality of points along the unmapped route in a new map data set; log additional data for at least a portion of the unmapped route in the new map data set; and communicate the new map data set to a remote data store from which another user can access the new map data.

In another illustrative embodiment, a computer-implemented method includes: determining when a computing device travels an unmapped route that is not included in existing map data; and in response to determining that the computing device travels the unmapped route: logging positional coordinates for each of a plurality of points along the unmapped route in a new map data set; and logging additional data for at least a portion of the unmapped route in the new map data set; and communicating the new map data set to a remote data store from which another user can access the new map data.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 2-4 are block diagrams of attributes of the system of FIG. 1;

FIGS. 5-7 are block diagrams of an illustrative system and illustrative screen displays for logging positional coordinates and additional data in a new map data set;

FIGS. 12 and 13 are block diagrams in partial schematic form of an electrically-powered vehicle and an internal combustion engine-powered vehicle, respectively, that may be equipped with the system of FIG. 1;

FIG. 14 is a perspective view of a cabin of a vehicle with access to the system of FIG. 1;

DETAILED DESCRIPTION

Figure 1:
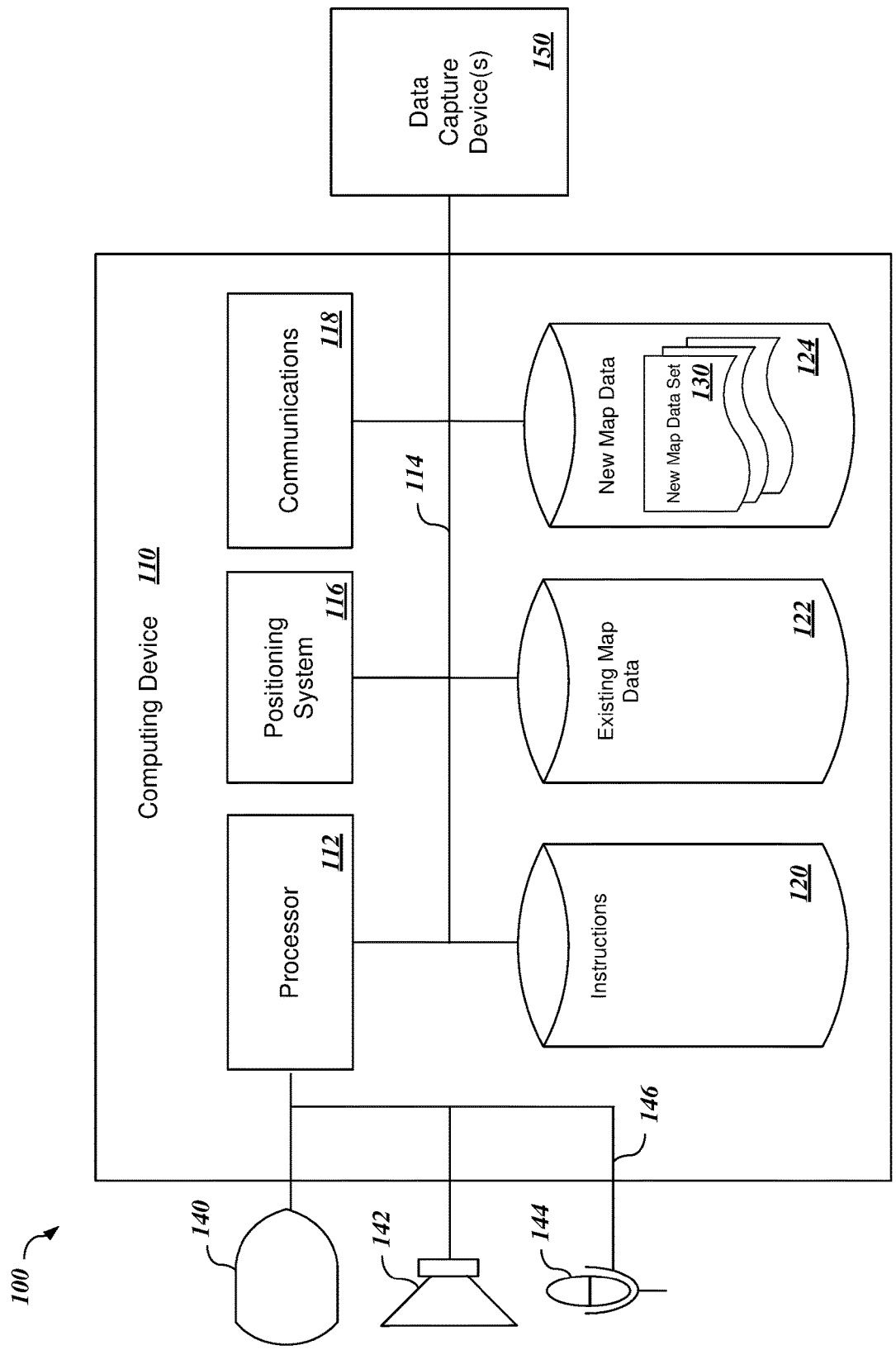
FIG. 1 is a block diagram of a system for logging positional coordinates and additional data for an unmapped route.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of a non-limiting introduction and overview, various disclosed embodiments include systems, vehicles, and computer-implemented methods for logging positional coordinates and other data for an unmapped route. In various embodiments, an illustrative system includes a computing device including: a positioning system configured to determine positional coordinates of the positioning system; a processor; and computer-readable media configured to store computer-executable instructions configured to cause the processor to: responsive to determining that the positional coordinates indicate that the positioning system is operating on an unmapped route that is not included in existing map data accessible by the processor, log the positional coordinates for each of a plurality of points along the unmapped route in a new map data set; log additional data for at least a portion of the unmapped route in the new map data set; and communicate the new map data set to a remote data store from which another user can access the new map data. In other words, using the positioning system and other data capture devices associated with the positioning system, the positioning system may map offroad travel of the positioning system by logging positional coordinates and other information. This information can be subsequently accessed to present a map of a route for subsequent offroad travel. The positional coordinates may be used to plot the route while the additional data provides details about the nature of the route, the difficulty of the terrain, or other information that may be used in considering or traveling the route.

Now that a general overview has been given, details of various embodiments will be explained by way of non-limiting examples given by way of illustration only and not of limitation.

Referring to FIG. 1, a system 100 includes a computing device 110 that may be associated with a vehicle, as further described below, and used for capturing data to create a new map data set for a route traveled that is not included in existing map data. The computing device 110 includes a processor 112 that is operated according to computer-executable instructions 120 stored in computer-readable media, such as nontransitory, nonvolatile solid-state or disc-based storage. The computing device 110 includes a positioning system 116, such as a Global Positioning System (GPS) or similar system, as described further below with reference to FIG. 3. In various embodiments, the positioning system 116 may actually be incorporated in a single computing device with the processor 112 and other devices herein described. Alternatively, the positioning system 116 may be a separate device that communicates with the processor 112. In either embodiments, the positioning system 116 is in communication with the processor of the computing device 110 as described below.

In various embodiments, the positioning system 116 is configured to access existing map data 122 that may be used to help the positioning system 116 to provide navigational assistance on known routes by correlating the positional coordinates with the existing map data 122. Using the positional coordinates, the positioning system 116 is able to identify its location where in the existing map data 122 for purposes of identifying where the positioning system 116 is located relative to known routes and/or identifiable destinations. Using this information, routes to a desired destination, anticipated travel times, turn-by-turn directions, and other information may be generated, as is familiar to users of navigation systems provided by GPS devices, smartphones, vehicle navigation systems, and similar systems.

In various embodiments, the existing map data 122 also may be used by the positioning system 116 to identify when the positioning system 116 is traveling a route that is not included in the existing map data 122. In various embodiments, as further described below, the computing device 110 may use the positioning system 116 to collect positional coordinates for a route in a store of new map data 124. The new map data 124 may store one or more new map data sets 130 for one or more routes not included in the existing map data 122. The one or more new map data sets 130 may be subsequently accessed to enable a user (not shown in FIG. 1) to consider traveling and/or to navigate the one or more routes described in the new map data sets 130. Like the computer-executable instructions 124, the existing map data 122 and the new map data 124 may be maintained in computer-readable media, such as nontransitory, nonvolatile solid-state or disc-based storage. As described further below, the existing map data 122 and the new map data 124 may be maintained in local storage within the computing device 110 and/or in a remote storage device (not shown in FIG. 1) from which the data may be accessed and/or may be stored.

In various embodiments, the system 100 also includes a display 140, such as an interactive touchscreen display often included in navigation systems, with which a user may review map data or other data and/or interact with the system 100. In various embodiments, the system 100 also includes an audio output device 142 to provide audible signals to a user, such as turn-by-turn directions. In various embodiments, the system 100 also includes an audio input device 144 to enable a user to provide verbal commands to engage with or control the system 100.

In addition, in various embodiments, the system 100 includes data capture devices 150 that may be used by the system 100 to gather information about a route being traveled. In various embodiments, the data capture devices 150 are used to gather information about the route in addition to the positional coordinates provided by the positioning system 116. The data capture devices 150 may be used to gather information about the nature and/or severity of the route, as further described below with reference to FIG. 4 and other figures. In various embodiments, components of the computing device 110 and other devices included in the system 100 communicate via a bus 114 or similar conduit for exchanging data between the devices. It will be appreciated that, although the components of the computing device 110 and other devices included in the system 100 are shown as communicating via a single bus 114 in FIG. 1, multiple shareable buses and/or dedicated buses or communication lines for particular components or devices also may be used.

Referring additionally to FIG. 2, in various embodiments, the existing map storage 122 and the new map data 124 may reside within the computing device 110 and/or may be reside in remote existing map data 222 and remote new map data 224 accessible by one or more remote computing devices 110. The remote existing data 222 may provide updates for the existing map data 122, may provide map data for areas not regularly traveled by the system 100 (FIG. 1) and, thus, not continually stored in the existing map data 122 residing within the computing device 110. Similarly, when one or more new map data sets 130 are created in the computing device 110, the new map data sets 130 may be copied or otherwise transferred to the remote new map data 224. The new map data sets 130 may be continually or periodically transferred to the remote new map data 224 or transferred when a particular new map data set 130 is completed, such as when offroad travel ends when the system 100 resumes travel on a route included in the existing map data 122 or 222. In addition, new map data sets 130 stored in the remote new map data 224 may be accessed via the computing device 110 to enable a user of the computing device 110 to review, consider, and/or navigate routes described by one or more new map data sets 130, as described further below. In various embodiments, the remote existing map data 222 and the remote new map data 224 are configured to operate as virtual storage or cloud storage such. Therefore, the exchange of information between the computing device 110 and the remote computing device 210 may be transparent to a user, without requiring any actions by the user to transfer data between the devices 110 and 210 or knowledge of the user that the data resides on which of the devices 110 and 210. The computing device 110 and the remote computing device 210 may communicate via a Wide Area Network 250, as further described below with reference to FIG. 16.

Referring additionally to FIG. 3, the positioning system 116 may include one or more different systems usable to determine positional coordinates of the system 100 (FIG. 1). In various embodiments, the positioning system 116 may include a Global Positioning System 316, a global navigation satellite system that triangulates a position of the positioning system in two-dimensional or three-dimensional space by communicating with three or more geosynchronous satellites. In various embodiments, in addition to the Global Positioning System 316, the system 100 may include a geolocation system 318. The geolocation system 318 may communicate with transmission sources, such as cellular communications towers or other wireless networks. By evaluating signal strength and/or triangulating these transmission sources, the geolocation system 318 may also determine positional coordinates of the positioning system 116. The Global Positioning System 316 and the geolocation system 318 may operate independently or in concert in which one of the systems 316 or 318 may complement the positional information available from the other of the systems 316 or 318 to provide positional coordinates of greater accuracy.

Referring additionally to FIG. 4, in various embodiments, the data capture devices 150 include one or more devices configured to capture data usable to represent and/or evaluate a new route that is travelled. The system 100 (FIG. 1) may incorporate one or more data capture devices 150 and/or the system 100 may be coupled with data capture devices 150, such as those that may be included with a vehicle (not shown in FIG. 4) with which the system is also associated. In various embodiments, the data capture devices 150 include an inertial measurement unit 452. The inertial measurement unit 452 may include one or more of accelerometers, gyroscopes, magnetometers, or other devices that are configured to detect and measure accelerations, forces, angular rates, angular orientation in one or more planes, or other data. As a result, the inertial measurement unit 452 may determine an incline of a slope, a sharpness of a turn, or other aspects of a route that may be representative of its severity and travelability.

In various embodiments, the data capture devices 150 also may include a compass 454 to measure orientation relative to the Earth's magnetic field. In various embodiments, an altimeter 456 may measure an altitude of a point (independently or in concert with data provided by the positioning system 116. In various embodiments, one or more cameras 458 may be used to capture image data representative of terrain or scenery. In various embodiments, other devices 460 also may include to measure roughness, slipperiness, or severity of terrain, or other information that be of interest in evaluating a particular route.

The operation of the devices of FIGS. 1-4 is further described below with reference to an example using the system 100 in travel. For purposes of the example, it is assumed that the system 100 and at least a portion of the devices herein described are associated with a vehicle that travels both on a known route included in the existing map data 122 and on a route that is not included in the existing map data 122.

Referring additionally to FIG. 5, the system 100 is transported by a vehicle (not shown in FIG. 5). A position 500 of the vehicle is represented on a map 505 presented on the display 140 of the system 100. The position 500 of the vehicle is on a known route 520 which, along with other numerous known routes 525, are included in the existing map data 122 of the system 100. In various embodiments, the positioning system 116 generates positional coordinates 550 that describes the position 500 of the vehicle in a two-axis space (x, y) to describe a lateral location of the vehicle or a three-axis space (x, y, z) to describe lateral and altitudinal locations of the vehicle. The system 100 is configured to attempt to correlate the positional coordinates 550 with the existing map data 122.

Because the system determines the position 500 of the vehicle is on the known route 520 that is included in the existing map data 122, the system 100 may provide navigation assistance using only the existing map data 122 without consulting the new map data 124 (which is thus represented in dotted lines in FIG. 5). It will be appreciated that the map 505 also may include at least one open area 530 that does not include any of the known roads 520 and/or 525. The open area 530 may include unmapped terrain, bodies of water, and/or other geographic features that are not spanned by known roads 520 and/or 525.

Figure 6:
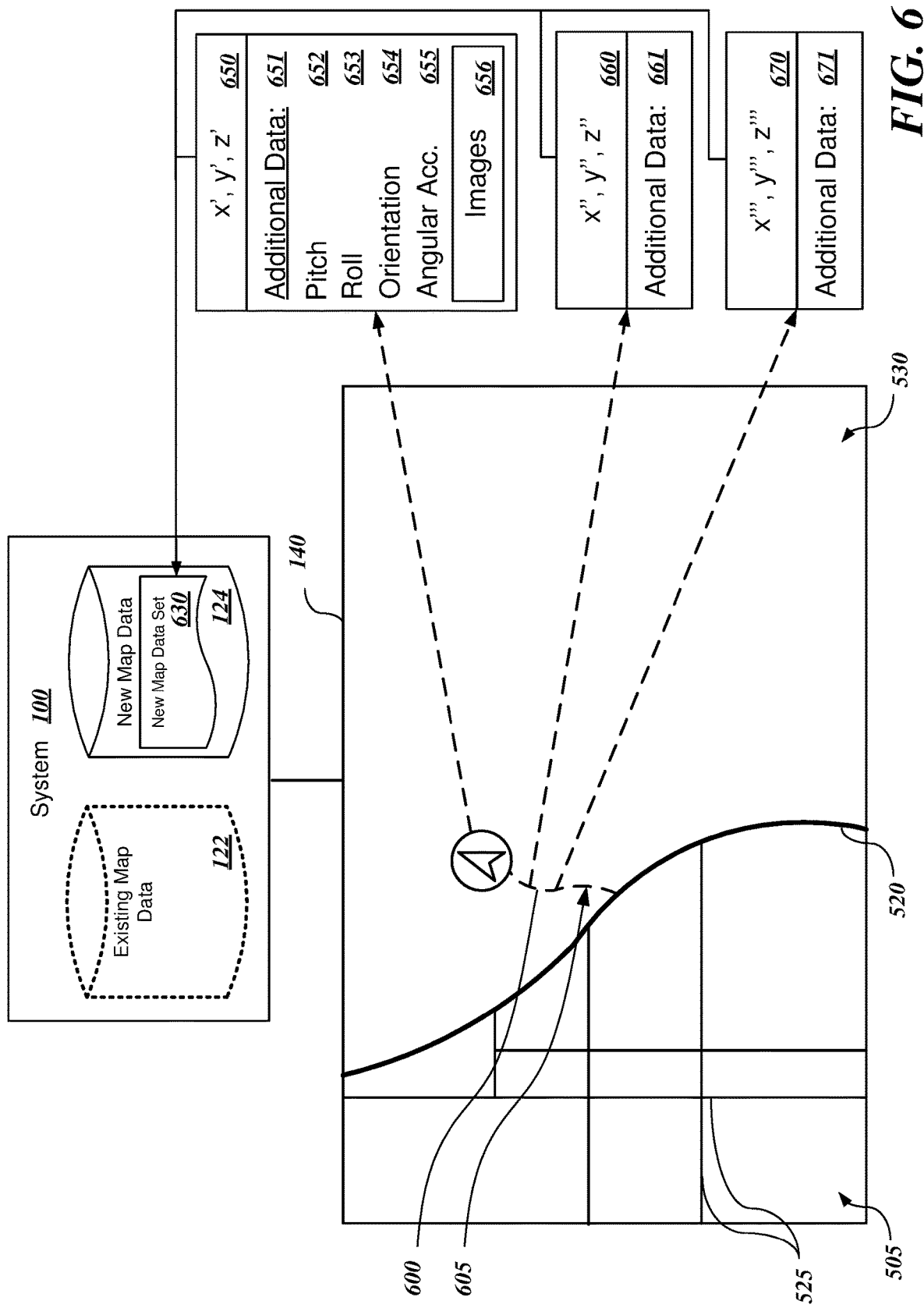

Referring additionally to FIG. 6, a position 600 of the vehicle shows that the vehicle has departed the known road 520 and is now located in the open area 530. The positioning system 116 generates positional coordinates (x', y', z') 650 which the system 100 determines is off of the known roads 520 and/or 525. Accordingly, the position 600 of the vehicle is no longer described within the existing map data 122 (which is thus represented in dotted lines in FIG. 6) and is situated on an unmapped route 605. In various embodiments, in response to the system 100 determining that the position 600 of the vehicle is not included in the existing map data 122, the system 100 logs the positional coordinates 650 for the position 600 and other coordinates traveled on the unmapped route 605 for inclusion in a new map data set 630.

In various embodiments, in addition to logging the positional coordinates 650, 660, and 670 along the unmapped route 605, the system 100 also collects data using the data capture devices 150 (FIGS. 1 and 4) to collect additional data 651, 661, and 671, respectively, at points along the unmapped route 605. In various embodiments, the additional data 651 collected for the positional coordinates 650 may include a pitch 652 of a slope or a roll 653 of the surface determined by the inertial measurement unit 452 (FIG. 4) or another device. In various embodiments, the additional data 651 also may include an orientation 653, such as a compass heading relative to a 360-degree frame of reference determined by the compass 454 (FIG. 4). In various embodiments, the additional data 651 also may include a recorded angular acceleration 655 at the point of capture to reflect the force acting on the vehicle at the positional coordinates 650 as determined by the inertial measurement unit 452 or another device. In various embodiments, the additional data may include still or motion images 656 that capture views of the unmapped route 605 from forward-facing, rear-facing, or side-facing cameras. In various embodiments, the positional coordinates 650, 660, and 670 and the additional data 651, 661, and 671, respectively, are stored in the new map data set 630 to record a detailed record of the unmapped route 605 for later analysis and consideration, as further described below.

It will be appreciated that data for the unmapped route 605, including the positional coordinates 650, 660, and 670 and the respective additional data 651, 661, and 671, may be sampled at any desired rate and in any desired manner. In various embodiments, the sampling may be performed at a predetermined time interval or a predetermined distance interval, or the intervals may vary depending on speed, slope, angular acceleration, user preferences, or other considerations. In various embodiments, each type of additional information 651, 661, or 671 may be collected at each of the associated positional coordinates 650, 660, and 670, respectively. In various embodiments, the types of additional information 651, 661, or 671 may be sampled at some predetermined portion of the associated positional coordinates 650, 660, and 670, respectively. For example, images 656 may not be collected at each of the positional coordinates 650, 660, and 670, but at a sampling thereof based on time, distance traveled, or other parameters. The sampling may be predetermined or adjustable based on user preferences. Neither the rate of sampling or types of data collected are limited.

Figure 7:
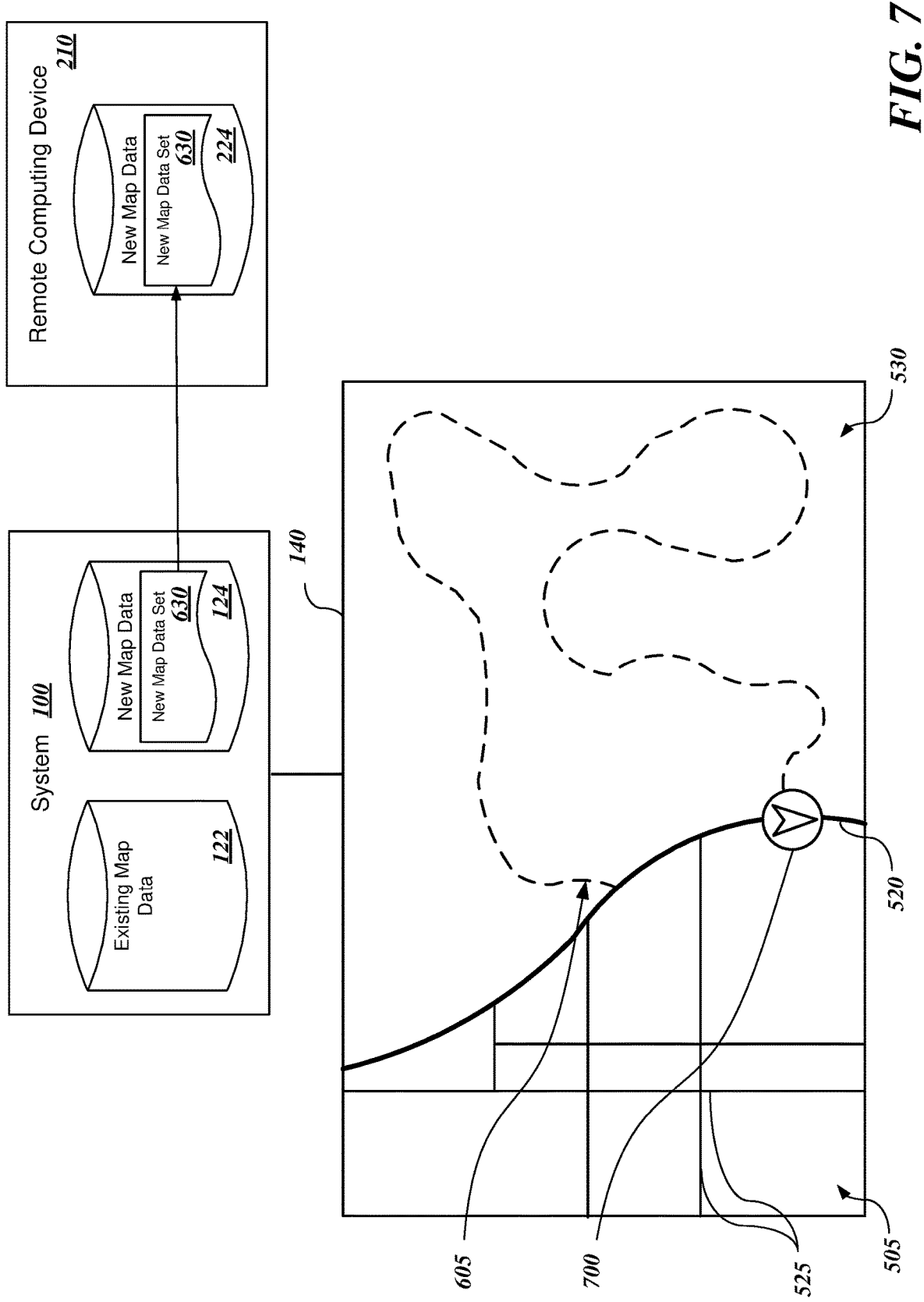

Referring additionally to FIG. 7, in various embodiments upon completion of the unmapped route 605, the new map data set 630 is uploaded to the new map data 224 at the remote computing device 210. In various embodiments, the unmapped route 605 is considered to be completed when the position 700 of vehicle is once again determined to be on a known road, such as the known road 520 included in the existing map data 122. The new map data set 630 may be communicated to the remote computing device 210 using the Wide Area Network 250 (FIG. 2). In various embodiments, data included in the new map data set 630 also may be continually transmitted to the remote computing device 210 as the data is collected, or the data may be communicated at a selected or predetermined interval.

It will be appreciated that, while the vehicle is away from known roads 520 and/or 525, it is possible that the vehicle may be out of range of the Wide Area Network 250 and, thus, be unable to upload the new map data set 630 while traveling the unmapped route 605. Thus, it may be desirable to upload the new map data set 630 after completing travel on the unmapped route 605. In addition, it will be appreciated that not every known route 520 and/or 525 may be within communications range of the Wide Area Network 250, thus, the new map data set 630 may be maintained on the system 100 until transmission of the Wide Area Network 250 is available. It also may be desirable to transmit the new map data set 630 when the system 100 is within range of a Wi-Fi network to avoid using bandwidth on a cellular network or other Wide Area Network 250. Embodiments are not limited to any particular process or timing for transmission of the new map data set 630 to the remote computing device 210.

Figure 8:
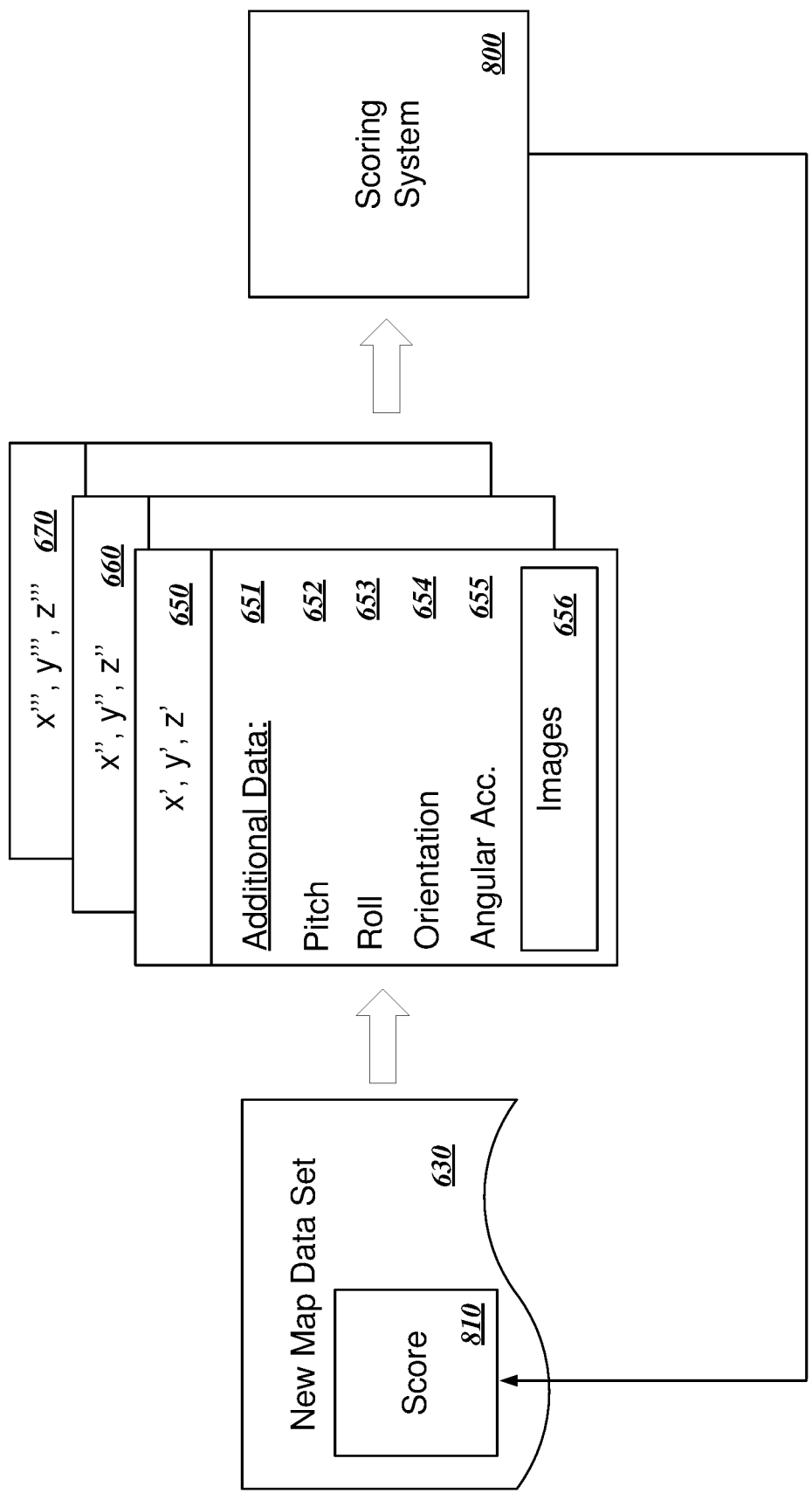
FIG. 8 is a schematic diagram of a scoring system for assigning a score to a route described in a new map data set.

Referring additionally to FIG. 8, in various embodiments, a scoring system 800 may be used to assign a score 810 to the unmapped route 605 (FIGS. 6 and 7) represented in the new route data set 630. In various embodiments, the scoring system 800 may include a software module that executes on the computing device 110 and/or the remote computing device 210 that evaluates elements of the new route data set 630 to evaluate a level of challenge or difficulty presented by the unmapped route 605.

In various embodiments, the scoring system 800 may evaluate the additional data 651, 661, and 671 associated with each of the respective positional coordinates 650, 660, and 670 and assign a score based on whether any of the parameters such as pitch 652, roll 653, angular acceleration 655, or other parameters exceed various thresholds. When the new route data set 630 does not include any parameters that exceed any of the thresholds, the scoring system 800 may assign a score 810 indicating that the unmapped route 605 (FIG. 6) is not difficult. By contrast, if the new route data set 630 includes parameters that exceed increasingly higher thresholds that may indicate a more difficult route, a score 810 indicating a higher degree of difficulty may be assigned by the scoring system 800. The score 810 may be associated with the new route data set 630 for the unmapped route 605 may be associated with the new route data set 630. Thus, when a user considers the unmapped route 605 as described below, the score 810 may help the user to decide whether to travel the unmapped route 605.

Figure 9:
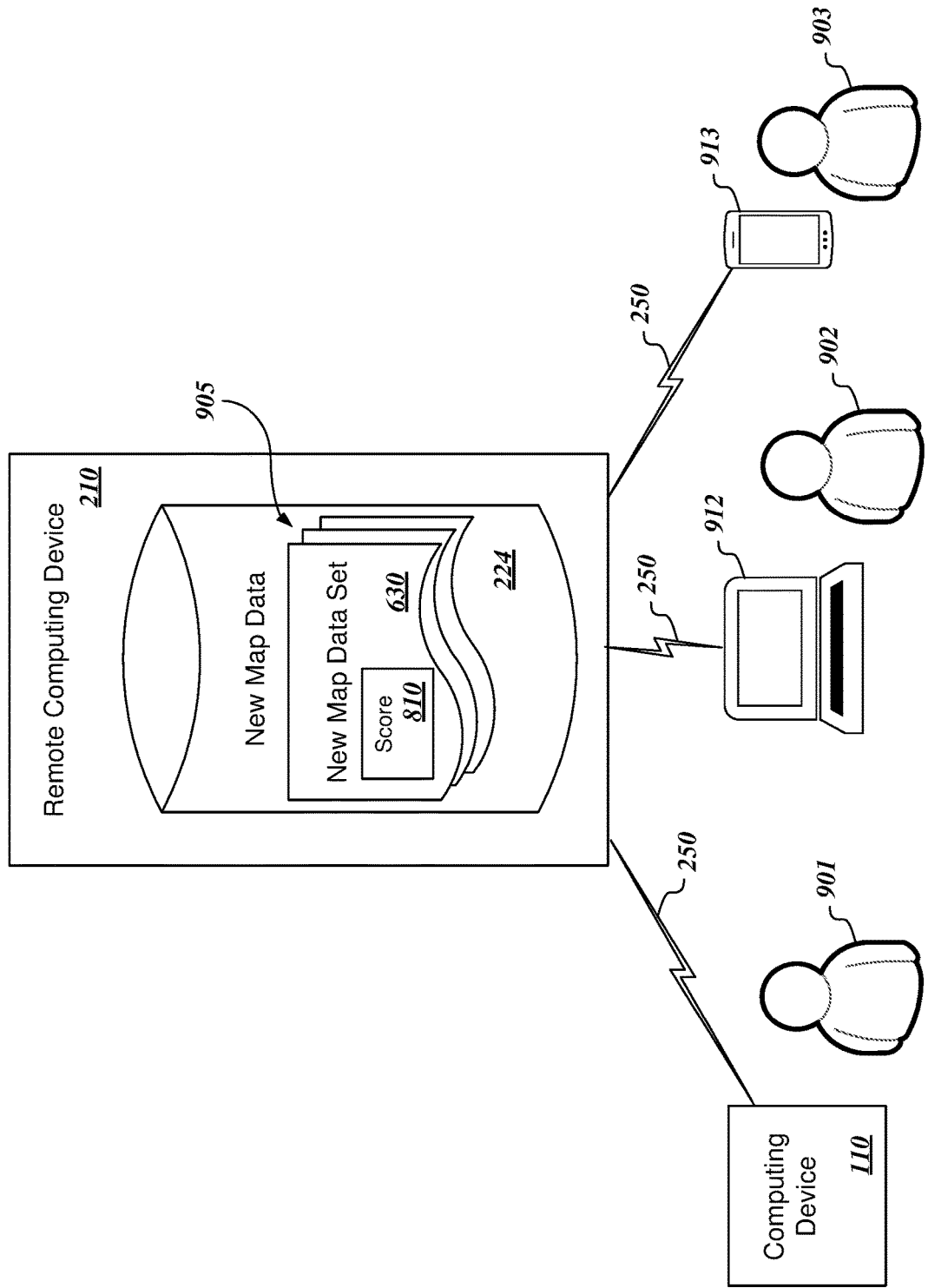
FIG. 9 is a block diagram of users accessing new map data sets over a network.

Referring additionally to FIG. 9, with the new route data set 630 made available via the remote computing device 210, either the user that operated the vehicle to generate the new route data set 630 or other users may access the new route data set 630. For example, a user 910 of a computing device 110 associated with a vehicle may search available new route datasets 905, which may include the new route data sets 930. The available new route datasets 905 may be searchable by location, duration, distance, degree of difficulty, or other parameters. The user 901 of the computing device 110 may be in their vehicle near the location of the unmapped route 605 (FIG. 6) associated with the new route data set 630. Using the Wide Area Network 250 to access the remote computing device 210, the user 901 may find the new route data set 930 and decide to travel the unmapped data route 605.

In various embodiments, users may search the available new route datasets 905 from other devices as well. For example, a user 902 of a computer 912, whether it be a desktop computer, laptop computer, tablet computer, or other computing system capable of accessing the remote computing device 210 via the Wide Area Network 250 also may research the unmapped route 605 described by the new route data set 630. Similarly, a user 903 of a smartphone 913, may access the remote computing device 210 via the Wide Area Network 250 also may research unmapped route 605 described by the new route data set 630. Thus, according to various embodiments, a user may use the system 100 to capture the new route data set 630 about the previously unmapped route so that they may revisit the route. In various embodiments, the new map data set 630 may be made available to others so that they may follow the route for which the original user recorded the new route data set 630.

Figure 10:
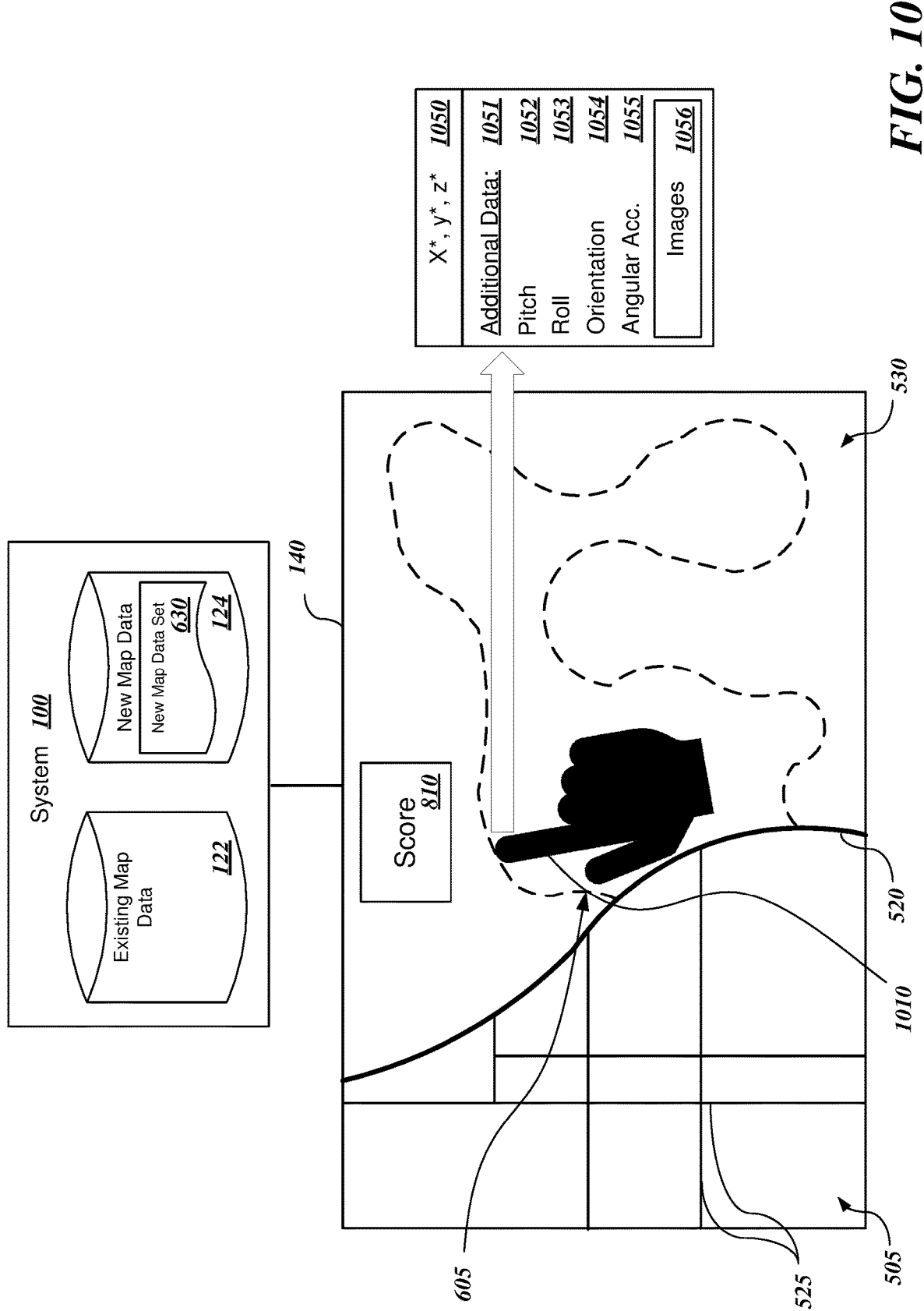
FIG. 10 is a block diagram of an illustrative system and an illustrative screen display for following a route described by a new map data set.

Referring additionally to FIG. 10, once a user finds the new route data set 630, the user can access the new route data set 630 in order to travel the unmapped route 630 described by the new route data set 630. Using a navigation system such as the system 100, the user may retrieve the new route data set 630. In various embodiments, the system 100 presents the route 605 described by the new route data set 630 on the display 140, similar to how the system 100 may present a route to a selected destination from the existing map data 122. In various embodiments, a user may make a selection along the route 605 (such as by using a digit 1010) to retrieve data about a location on the route 605, such as position coordinates 1050 and additional data 1051 that may include pitch 1052, roll 1053, orientation 1054, and angular acceleration 1055. The user also may be able to retrieve images 1056 that were captured with and associated with the position coordinates 1050.

In various embodiments, the system 100 may integrated into a vehicle such as a car, truck, sport utility vehicle, van, or recreational vehicle. In various embodiments, the vehicle also may include a motorcycle, all-terrain vehicle, or an electrically-powered moped or bicycle.

Figure 11:
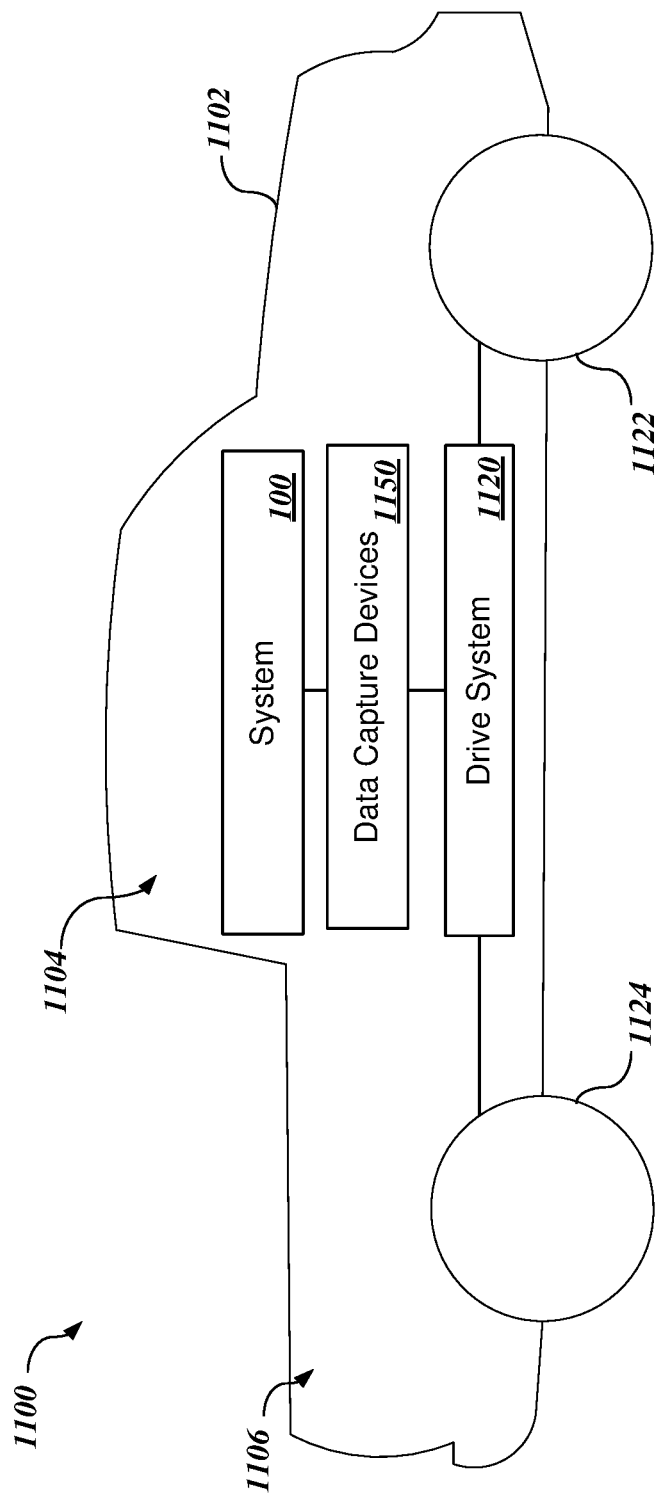
FIG. 11 is a block diagram in partial schematic form of an illustrative vehicle that includes the system of FIG. 1.

Referring additionally to FIG. 11, in various embodiments a vehicle 1100 includes the system 100 for logging positional coordinates and additional data for an unmapped route as herein described. In various embodiments, the vehicle 1100 includes a body 1102 that may include a cabin 1104 capable of accommodating an operator, one or more passengers, and/or cargo and a cargo area 1106 separate from the cabin 1104, such as a trunk or a truck bed, capable of transporting cargo. The system 100 may be accessible from the cabin 1104. The vehicle 1100 includes a drive system 1120, as further described below, which is selectively engageable with one or more front wheels 1122 and/or one or more rear wheels 1124 to motivate, accelerate, decelerate, stop, and steer the vehicle 1100. In various embodiments, the vehicle 1100 also includes data capture devices 1150, such as those previously described with reference to FIG. 4. In various embodiments, the system 100 may be in communication with both the data capture devices 1150 and the drive system 1120 which may include sensing or data capture devices that also may be used to collect data about the terrain being traveled.

Referring additionally to FIG. 12, in various embodiments the system 100 may be used with an electrically-powered vehicle 1200. The wheels 1212 and/or 1214 may be motivated by one or more electrically-powered drive systems 1220 and/or 1224, such as motors, operably coupled with the wheels 1212 and/or 1214. The drive systems 1222 and 1224 draw power from the battery system, which also may be used to power the system 100.

Referring additionally to FIG. 13, in various embodiments the system 100 may be used with an internal combustion engine-powered vehicle 1300. The wheels 1312 and/or 1314 may be motivated by an internal combustion or hybrid engine 1320 coupled with a fuel tank 1310 via a fuel line 1311. The engine 1320 may be coupled to the wheels 1312 and/or 1314 by mechanical linkages 1330 and 1340, respectively, including axles, transaxles, or other drive train systems to provide rotational force to power the wheels 1312 and/or 1314. It will be appreciated that FIGS. 11-13 show four-wheeled land vehicles. However, as previously mentioned, it will be appreciated that the system 100 may be integrated with other land vehicles.

Referring additionally to FIG. 14, in various embodiments, the system 100 may be integrated into a dashboard or console 1410 within a cabin of a vehicle. The display 140 (FIG. 1) may be fixed to the dashboard or console 1410 where it can be accessed by an operator or passenger of the vehicle. In various embodiments, a portable computing device 1450 may be configured as described with reference to the system 100 and transported aboard the vehicle. The portable computing device 1450, which may include a smartphone, a tablet computer, or another portable device, may interface with the data capture devices 150 (FIG. 1) via a wired or wireless interface 1460.

Figure 15:
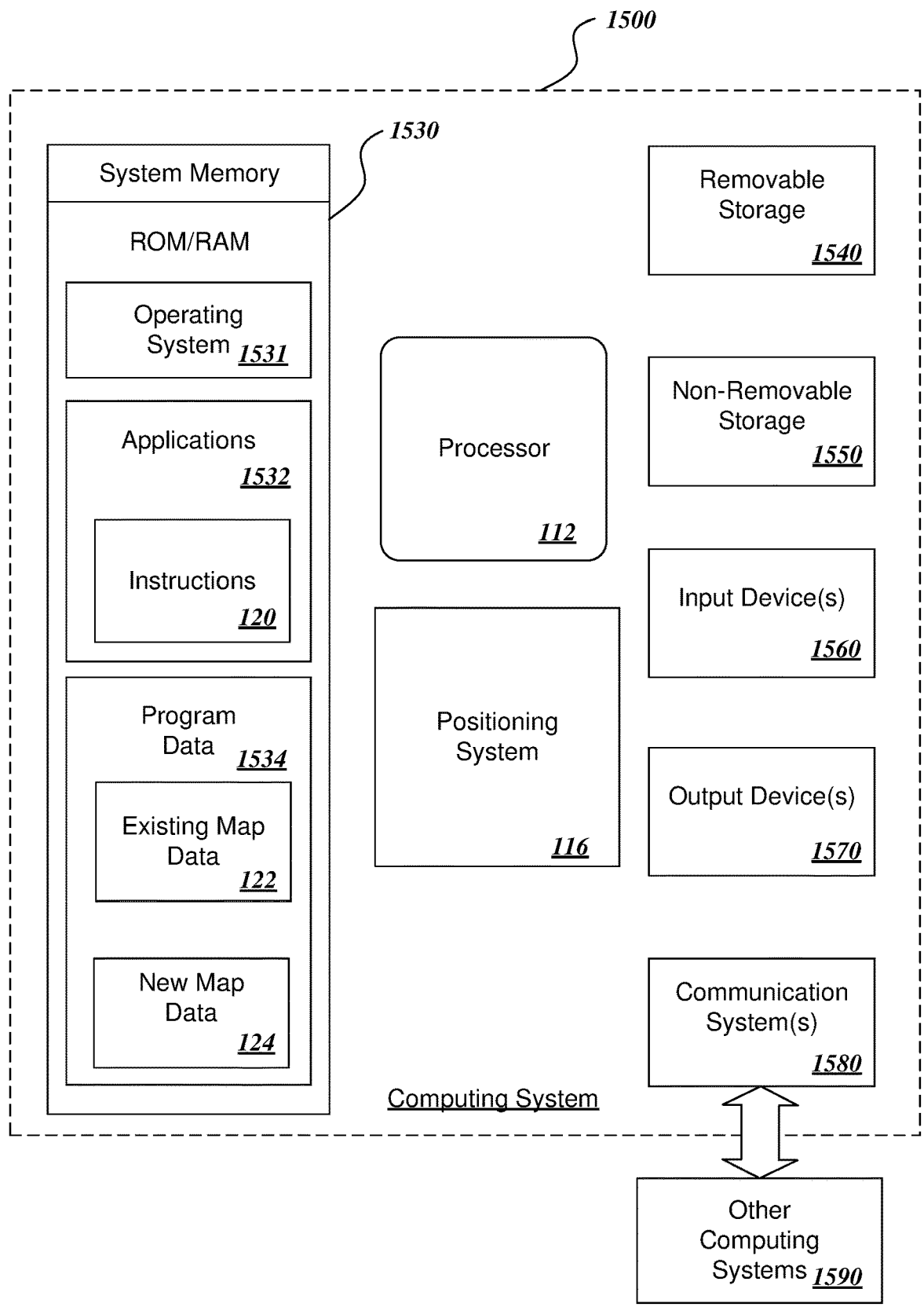
FIG. 15 is a block diagram of an illustrative computing system for performing functions of the system of FIG. 1.

Referring additionally to FIG. 15 and given by way of example only and not of limitation, the system 100 may include a general purpose computing system 1500 configured to operate according to computer-executable instructions for logging positional coordinates and additional information. The computing system 1500 typically includes at least one processor 112, as described with reference to FIG. 1, and a system memory 1530. Depending on the configuration and type of computing system, the system memory 1530 may include volatile memory, such as random-access memory ("RAM"), non-volatile memory, such as read-only memory ("ROM"), flash memory, and the like, or a combination of volatile memory and non-volatile memory. The system memory 1530 typically maintains an operating system 1531, one or more applications 1532, and program data 1534. The operating system 1531 may include any number of operating systems executable on desktop or portable devices including, but not limited to, Linux, Microsoft Windows®, Apple iOS®, or Android®, or a proprietary operating system. The applications 1532 may include the instructions 120 to log positional coordinates and additional data as herein described, as well as instructions to send or receive new map data sets, as previously described. The program data 1534 may include the existing map data 122 and the new map data 124, as previously described.

The computing system 1500 may also have additional features or functionality. For example, the computing system 1500 may also include additional data storage devices (removable and/or non-removable) such as, for example, magnetic disks, optical disks, tape, or flash memory. Such additional storage devices are illustrated in FIG. 15 by removable storage 1540 and non-removable storage 1550. Computer storage media may include volatile and non-volatile, removable and non-removable media implemented in any method or technology for storage of information, such as computer-readable instructions, data structures, program modules or other data. The system memory 1530, the removable storage 1540, and the non-removable storage 1550 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing system 1500. Any such computer storage media may be part of the computing system 1500.

The computing system 1500 may also have input device(s) 1560 such as a keyboard, stylus, voice input device, touchscreen input device, etc. Output device(s) 1570 such as a display, speakers, short-range transceivers such as a Bluetooth transceiver, etc., may also be included. The computing system 1500 also may include one or more communication systems 1580 that allow the computing system 1500 to communicate with the Wide Area Network 250 (FIG. 2) other computing systems 1590, such as the remote computing device 210. The communication system 1580 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media. The computing system 1500 may include the positioning system 116, which may include Global Positioning System ("GPS") and/or geolocation circuitry, as previously described.

Figure 16:
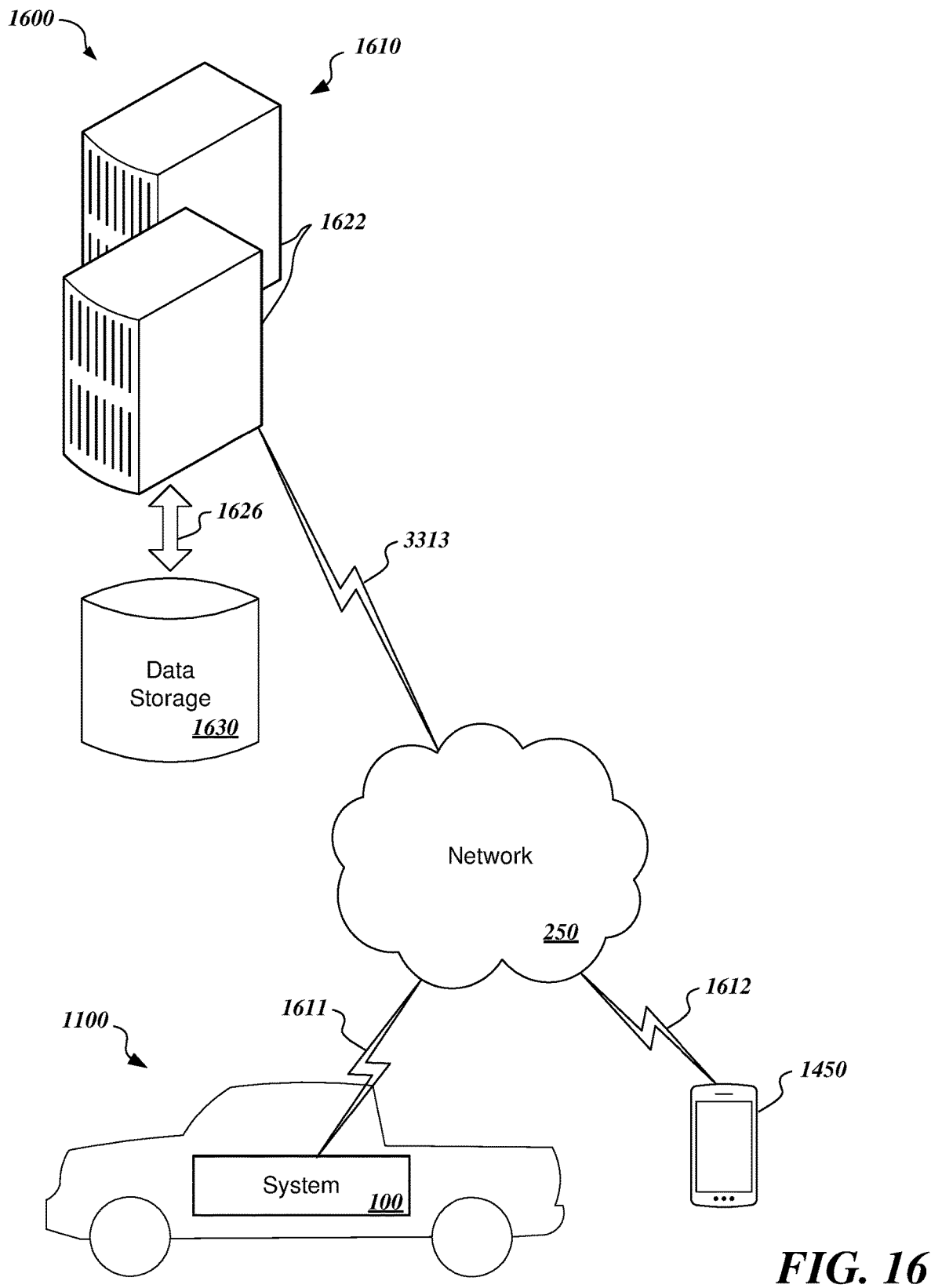
FIG. 16 is a block diagram of one or more illustrative systems of FIG. 1 communicating with one or more remote computing systems.

In addition to one or more onboard computing systems, various embodiments may communicate with remote computing systems to perform the functions herein described. Referring additionally to FIG. 16, an operating environment 1600 may include one or more sets of remote computing systems 1610 which may operate like remote computing device 210 (FIG. 2) to, for example, receive and source new map data sets 130. It will be appreciated that the remote computing systems 1610 may include one or more computing devices 1622 that may reside at one or more locations. In various embodiments, the remote computing systems 1610 each may include a server or server farm. Instructions or data, such as the new map data sets 130 (FIG. 1) may be stored in high-speed storage 1630 that is accessible by the remote computing systems 1610 over a high-speed bus 1626.

In various embodiments, the remote computing systems 1610 communicate with the Wide Area Network 250 (FIG. 2) over wired and/or wireless communications links 1613. The system 100 may be integrated with or transportable aboard a vehicle, such as the vehicle 1100 (FIG. 11). The system 100 may communicate over the Wide Area Network 250 via communications links 1611 to access the remote computing systems 1610 to store data to or retrieve data from the data storage 1630. The communications links 1611 may include wireless communications links to enable mobile communications with the system 100 or may include a wired links to be used, for example, when the vehicle 1100 includes an electric vehicle that is stopped and/or plugged in for charging. As previously described, the system 100 also may be implemented on a portable computing device 1450 that may communicate with the Wide Area Network 250 via wireless communications links 1612.

Figure 17:
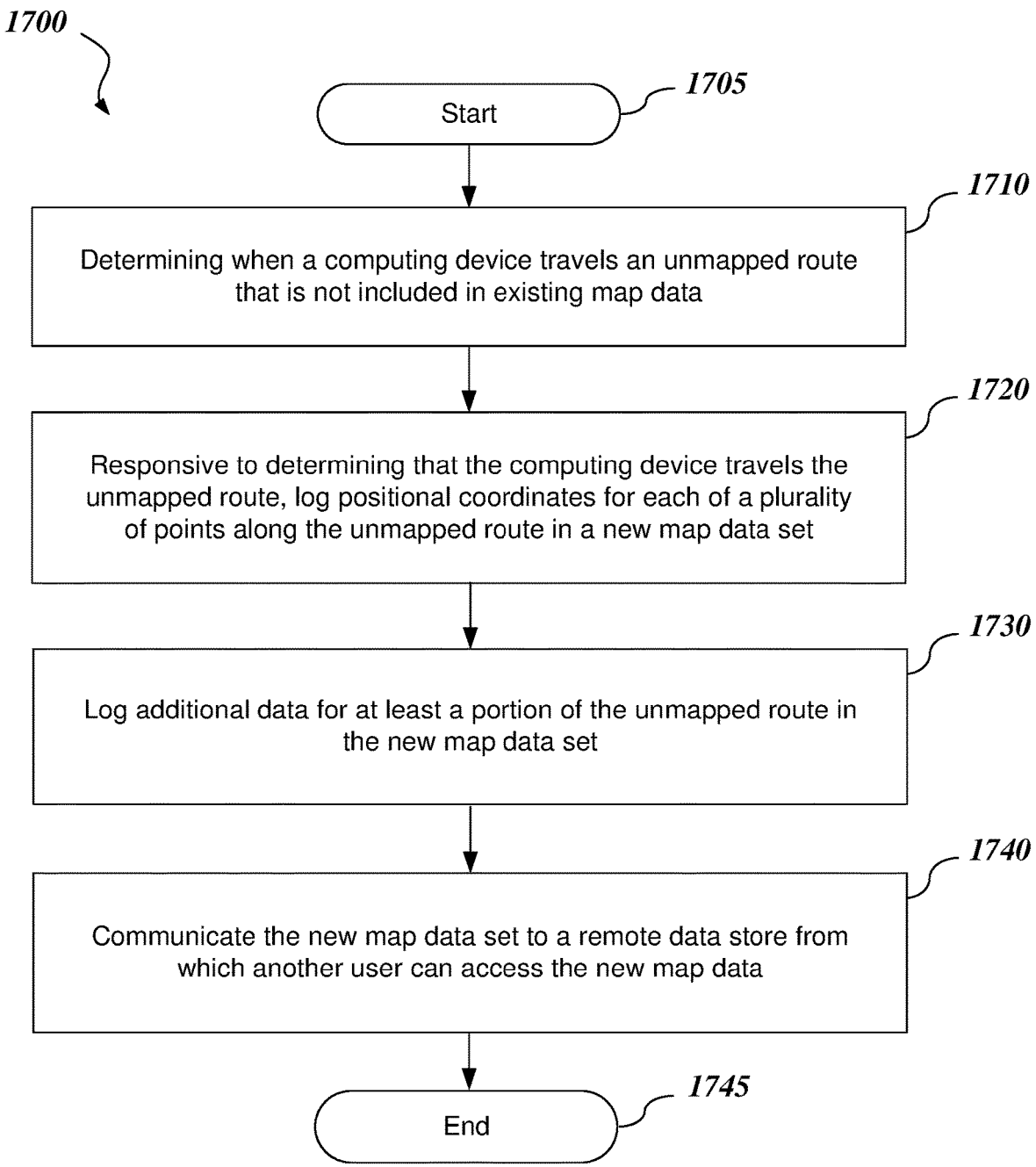
FIG. 17 is a flow chart of an illustrative method for logging positional coordinates and additional data for an unmapped route.

Referring additionally to FIG. 17, an illustrative method 1700 is provided for logging positional coordinates and additional data for an unmapped route. The method begins at a block 1705. At a block 1710, it is determined when a computing device travels an unmapped route that is not included in existing map data. At a block 1720, responsive to determining that the computing device travels the unmapped route, positional coordinates for each of a plurality of points along the unmapped route are logged in a new map data set. At a block 1730, additional data is logged for at least a portion of the unmapped route in the new map data set. At a block 1740, the new map data set is communicated to a remote data store from which another user can access the new map data. The method ends at a block 1745.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
   a computing device including:
      a processor;
      a positioning system in communication with the processor and configured to determine positional coordinates of the positioning system; and computer-readable media configured to store computer-executable instructions configured to cause the processor to:
responsive to determining that the positional coordinates indicate that the positioning system is operating on a new unmapped route that is not included in an existing map data repository accessible by the processor, log the positional coordinates for each of a plurality of points along the new unmapped route in a new route data set including the new unmapped route;
log additional data for at least a portion of the new unmapped route in the new route data set;
assign, by a scoring system based on at least the additional data, a route difficulty score to the new unmapped data;
determine the new unmapped route is completed based on a determination that a position, as determined by the positioning system, of the computing device is on a known road in the existing map data repository; and
communicate the new route data set and the route difficulty score to a new map data repository of a remote data store that is accessible by one or more users other than a user associated with the computing device, the new map data repository including a plurality of prior new route data sets,
wherein each of the plurality of prior new route data sets comprises a prior unmapped route relative to the existing map data repository such that the new route data set and the route difficulty score are searchable, by the one or more users, from among the new unmapped route and the plurality of prior unmapped routes within the new map data repository.

2. The system of claim 1, wherein the computing device is incorporated in a land vehicle and the new unmapped route includes an off-road path.

3. The system of claim 2, wherein the land vehicle is chosen from an electrically-powered vehicle, an internal combustion engine-powered vehicle, and a hybrid vehicle.

4. The system of claim 3, wherein the additional data is collected by at least one data capture device associated with the land vehicle.

5. The system of claim 4, wherein the at least one data capture device includes at least one device chosen from a camera configured to collect image data of the new unmapped route and an inertial measurement unit configured to collect orientation data of the land vehicle corresponding to at least one feature of the new unmapped route.

6. The system of claim 2, wherein the existing map data repository includes at least one of an on-board existing map data repository stored in the computing device and a remote existing map data repository accessible by the computing device from a remote data store.

7. The system of claim 1, wherein the positional coordinates include at least one set of coordinates chosen from global positioning system coordinates and geolocation coordinates.

8. The system of claim 1, wherein the new map data set is stored in an on-board new map data repository of the computing device until the new map data set is transferred from the computing device to the new map data repository of the remote data store.

9. The system of claim 1, wherein the computer-readable media is further configured to store computer-executable instructions of an unmapped route scoring module configured to cause the processor to associate the difficulty score with the new route data set in the new map data repository of the remote data store, and wherein the additional data is collected by at least one data capture device of a land vehicle incorporating the computing device.

10. A vehicle comprising:
a vehicle body;
a drive system; and
a computing device including:
a processor;
a positioning system in communication with the processor and configured to determine positional coordinates of the positioning system; and
computer-readable media configured to store computer-executable instructions configured to cause the processor to:
responsive to determining that the positional coordinates indicate that the positioning system is operating on a new unmapped route that is not included in an existing map data repository accessible by the processor, log the positional coordinates for each of a plurality of points along the new unmapped route in a new route data set;
log additional data for at least a portion of the new unmapped route in the new route data set;
determine, by a scoring system based on at least the additional data, whether the new unmapped route exceeds one or more thresholds;
assign, based on the determination whether the new unmapped route exceeds the one or more thresholds, an indication of difficulty to the new unmapped route;
determine the new unmapped route is completed based on a determination that a position, as determined by the positioning system, of the computing device is on a known road in the existing map data repository; and
communicate the new route data set and the indication of difficulty to a new map data repository of a remote data store that is accessible by one or more users other than a user associated with the vehicle, the new map data repository including a plurality of prior new route data sets,
wherein the new route data set includes the new unmapped route and each of the plurality of prior new route data sets comprises a prior unmapped route relative to the existing map data repository, such that the new route data set and the indication of difficulty are searchable, by the one or more users, from among the new unmapped route and the plurality of prior unmapped routes within the new map data repository.

11. The vehicle of claim 10, wherein the additional data is collected by at least one data capture device associated with the vehicle.

12. The vehicle of claim 11, wherein the at least one data capture device includes at least one device chosen from a camera configured to collect image data of the new unmapped route and an inertial measurement unit configured to collect orientation data of the vehicle corresponding to at least one feature of the new unmapped route.

13. The vehicle of claim 10, wherein the existing map data repository includes at least one of an on-board map existing data repository stored in the computing device and a remote existing map data repository accessible by the computing device from a remote data store.

14. The vehicle of claim 10, wherein the positional coordinates include at least one set of coordinates chosen from global positioning system coordinates and geolocation coordinates.

15. The vehicle of claim 11, wherein the computer-readable media is further configured to store computer-executable instructions of an unmapped route scoring module configured to cause the processor to assign a route difficulty score to the new unmapped route based on the additional data and associate the difficulty score with the new route data set in the new map data repository of the remote data store.

16. A computer-implemented method comprising:
   determining, based on a positioning system, whether a computing device travels a new unmapped route that is not included in an existing map data repository; and
   in response to determining that the computing device travels the new unmapped route:
      logging positional coordinates for each of a plurality of points along the new unmapped route in a new route data set;
      logging additional data for at least a portion of the new unmapped route in the new route data set;
      responsive to a determination, based on the positioning system, that a position of the computing device is on a known road in the existing map data repository, determining the new unmapped route is completed; and
      communicating the new route data set to a new map data repository of a remote data store that is accessible by one or more users other than a user associated with the computing device, the new map data repository including a plurality of prior route map data sets,
   wherein the new route data set includes the new unmapped route and each of the plurality of prior route map data sets comprises a prior unmapped route relative to the existing map data repository such that the new route data set is searchable, by the one or more users, from among the new unmapped route and the plurality of prior unmapped routes within the new map data repository.

17. The computer-implemented method of claim 16, further comprising collecting the additional data with at least one data capture device chosen from a camera configured to collect image data of the new unmapped route and an inertial measurement unit configured to collect orientation data of the computing device corresponding to at least one feature of the new unmapped route.

18. The computer-implemented method of claim 17, further comprising assigning a difficulty score to the unmapped route included in the new route data set based on the additional data and associating the difficulty score with the new route data set in the new map data repository of the remote data store.

19. The system of claim 1, wherein at least one of the logged positional coordinates for each of the plurality of points along the new unmapped route or the logged additional data for the at least portion of the new unmapped route indicates an altitude for the at least portion of the new unmapped route.

20. The system of claim 9, wherein the additional data comprises a pitch, a roll, and an angular acceleration of a vehicle, and wherein the route difficulty score is based on the pitch, the roll, and the angular acceleration of the vehicle.

21. The system of claim 10, wherein the computer-executable instructions cause the processor to communicate the new route data set to the new map data repository responsive to determining the new unmapped route is completed based on a determination that a position, as determined by the positioning system, of the vehicle body is on a known road in the existing map data repository.

* * * * *